(12) United States Patent
Suzuki et al.

(10) Patent No.: US 6,833,649 B2
(45) Date of Patent: Dec. 21, 2004

(54) ELECTRIC ROTARY MACHINE

(75) Inventors: Yuzuru Suzuki, Shizuoka-ken (JP); Kunitake Matsushita, Shizuoka-ken (JP); Seiichi Matsuura, Shizuoka-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 10/372,072

(22) Filed: Feb. 21, 2003

(65) Prior Publication Data

US 2004/0000837 A1 Jan. 1, 2004

(30) Foreign Application Priority Data

Feb. 27, 2002 (JP) ........................................ 2002-051007

(51) Int. Cl.[7] ............................ H02K 1/06; H02K 1/14; H02K 1/18
(52) U.S. Cl. ........................................ 310/218; 310/216
(58) Field of Search ................................ 310/216–218, 310/254

(56) References Cited

U.S. PATENT DOCUMENTS 6,177,751 B1 * 1/2001 Suzuki et al. ................ 310/269
6,411,006 B2 * 6/2002 Suzuki et al. ................ 310/254
6,573,632 B2 * 6/2003 Hsu ............................ 310/216

FOREIGN PATENT DOCUMENTS

JP        2001-238377        8/2001

* cited by examiner

Primary Examiner—Tran Nguyen
(74) Attorney, Agent, or Firm—Fay, Sharpe, Fagan, Minnich & McKee, LLP

(57) ABSTRACT

An electric rotary machine is provided, in which a stator armature includes a stator ring that encloses a plurality of salient poles each with a pole tooth thereby forming a magnetic circuit, and in which the inner surface of the stator ring is made flat at portions to be in contact with the outer end faces of the pole teeth so that the stator ring can make surface-to-surface contact with the pole teeth without any air gap therebetween so as to secure a well-balanced magnetic circuit.

6 Claims, 7 Drawing Sheets

ELECTRIC ROTARY MACHINE

BACKGROUND OF THE INVENTION

1. Field of the Invention

The present invention relates to an electric rotary machine (hereinafter referred to occasionally as "motor" as appropriate), and particularly to a radial gap type electric rotary machine having a structure of divided salient poles.

2. Description of the Related Art

There has been a conventional electric rotary machine including a stator armature (herein after referred to as "armature") structured such that a plurality of ring-shaped yoke pieces, which are made of soft magnetic steel plates (silicon steel plates, etc.) and which each have a plurality of pole tooth portions radially protruding, are stacked in the axial direction. When manufacturing this conventional electric rotary machine, each of the ring-shaped yoke pieces is punched out integrally with the plurality of pole tooth portions as a single piece. Therefore, the pole tooth portions are not structurally separated from the yoke piece and a resultant armature has a superior magnetic efficiency (low magnetic reluctance).

However, in case of a small electric rotary machine, since a wire is usually wound directly on each pole tooth portion, the integrally structured armature makes the winding operation troublesome. In particular, in case of an inner rotor type rotary machine, the winding operation is extremely difficult. As a result, there are two problems in that the winding operation requires a long time, and that it is impossible to increase the space factor of the wiring. And also, because the winding is done by flyer winding, torsional stress may be applied to a wire during the winding operation to restrict insulation reliability of the winding portion.

Confronted with these difficulties, in recent years, a rare earth magnet having high energy product has been developed and the structure of the electric rotary machine has been reviewed by the analysis of magnetic circuits using a computer. This results in enabling a divided armature type electric rotary machine to achieve desired motor characteristics. Although magnetic reluctance is slightly increased in this divided armature type electric rotary machine, the winding operation is easy and also the space factor can be increased, which outweighs the undesirable increase in magnetic reluctance.

As a result, it has been recently found that the divided armature type electric rotary machine is superior on the whole in the achievement of higher performance and lower cost. Therefore, nowadays there is a growing demand for the divided armature.

One example of the above divided armature is conventionally manufactured such that an armature yoke which is constituted by a plurality of ring-shaped plate yoke pieces stacked in their axial direction has its pole tooth portions separated from its main body portion and a winding is provided around each of the pole tooth portions separated, and then, the pole tooth portions with respective windings therearound, namely salient poles, are joined back to their respective original locations on the main body portion by laser beam welding or the like.

However, this conventional method needs much labor because the armature is once divided and then joined again. Moreover, when the separated pole tooth portions are put back together, the stack layers of the both portions have to be properly matched with each other. Therefore, it is necessary to set the divided pole tooth portions in a well maintained die or tool which ensures the assembling precision satisfactorily and also to securely weld them on a one-by-one basis for reinforcement. As a result, it is difficult to maintain high precision, and workability is low. In addition, the mechanical and magnetic characteristics are significantly degraded at the joined (welded) portions inherently. Thus, the conventional divided type armature still has a few problems to be solved.

In order to solve such problems, the present inventors have proposed in Japanese Unexamined Patent Publication No. 2001-238377 a radial gap type electric rotary machine with a divided armature comprising a plurality of separated pole tooth portions and two kinds of rings which magnetically and mechanically join the separated pole tooth portions. One ring is a pole tooth ring for positioning and fixing the pole tooth portions and the other ring is a stator ring for reducing the leakage flux resulting from magnetic discontinuity.

Figure 1:
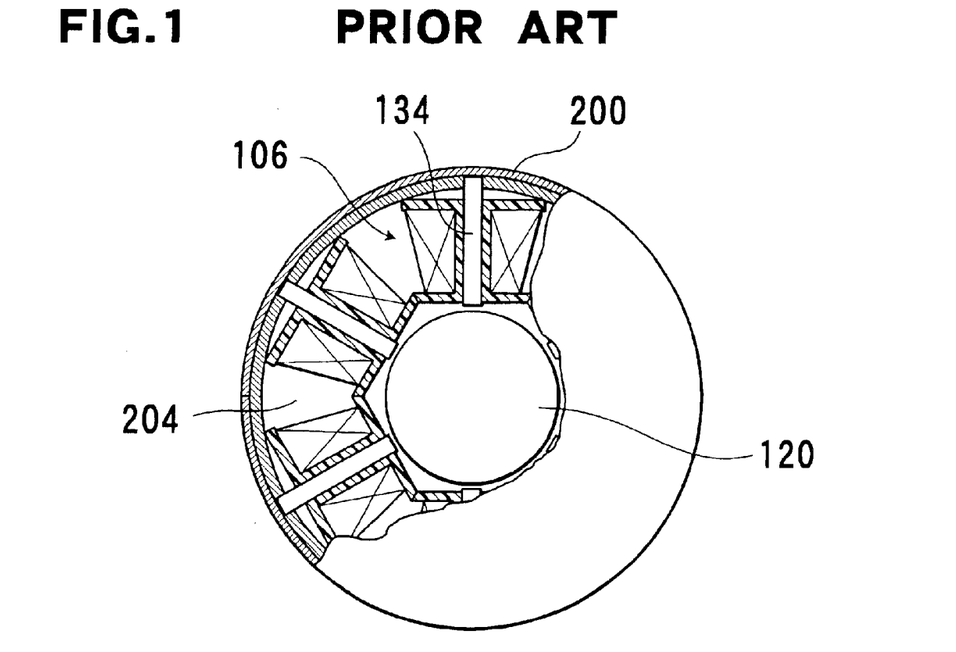
FIG. 1 is a partially sectional view seen in an axial direction, showing an electric rotary machine which has been disclosed in Japanese Unexamined Patent Publication No. 2001-238377.

FIG. 1 is a partially sectional front elevation view seen from the axial direction showing the electric rotary machine which has been disclosed in Japanese Unexamined Patent Publication No. 2001-238377. FIG. 1 shows a rotor assembly 120, salient poles 106, pole teeth 134 each constituting each salient pole 106, resin spaces 204 each provided between one salient pole and its adjacent salient pole, and filled with resin at the end of assembling the electric rotary machine, and a stator ring 200 to form a magnetic circuit by enclosing all the salient poles 106.

Figure 2:
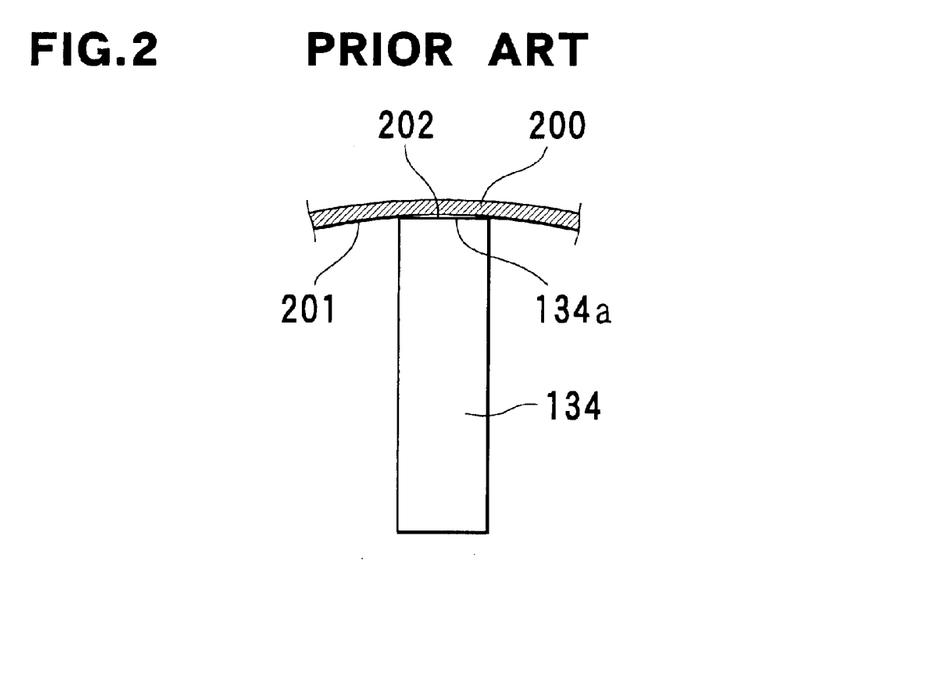
FIG. 2 is an enlarged view of a portion where a pole tooth is joined to a stator ring shown in the sectional view of the electric rotary machine shown in FIG. 1.

FIG. 2 is an enlarged view of a contact portion between the pole tooth 134 and the stator ring 200 in the electric rotary machine shown in FIG. 1. FIG. 2 shows a front end surface 134a of the pole tooth 134, an inner surface 201 of the stator ring 200, and an air gap 202 formed between the inner surface 201 and the front end surface 134a.

However, the following problems arise in the conventional electric rotary machine disclosed in the above Japanese Unexamined Patent Publication No. 2001-238377.

As shown in FIGS. 1 and 2, the front end surface 134a of the pole tooth 134 opposite to an end surface facing the rotor assembly is flat, while the inner surface 201 of the stator ring 200 is arced since the stator ring 200 is cylindrical.

Therefore, when the pole tooth 134 is joined to the inner surface 201 of the stator ring 200, only both very edges of the front end surface 134a of the pole tooth 134 are in contact with the inner surface 201 of the stator ring 200, thus generating air gap 202 between the front end surface 134a of the pole tooth 134 and the inner surface 201 of the stator ring 200. Therefore, this structure causes loss in a flux leakage passing from the pole tooth 134 of the salient pole 106 to the stator ring 200 thereby decreasing magnetic efficiency.

The decrease in magnetic efficiency will become sharp as the curvature of the stator ring 200 becomes small, and it will deteriorate the motor characteristics. This gives a serious problem in the development of the electric rotary machine having a small diameter for downsizing.

Furthermore, in the above conventional manufacturing method the pole tooth of each salient pole is in contact with the stator ring along lines, and even at points in the extreme case depending on the variation in precision of assembly. Therefore, it is extremely difficult to maintain a stable and uniform contact therebetween.

The above unstable contact between the pole teeth of the salient poles and the stator ring causes uneven magnetic reluctance between the salient poles and the stator ring, and as a result, the electric rotary machine loses its magnetic balance on the whole, which will cause the torque ripple to increase, thus making the electric rotary machine vibrate easily while rotating. For example, when the electric rotary machine with this problem is used for a printer, print-density may be incurred.

SUMMARY OF THE INVENTION

The present invention has been made in view of the above-described circumstances in the prior arts, and it is an object of the present invention to provide a radial gap type electric rotary machine, wherein a stator ring and a plurality of salient poles are in contact with each other without any air gap therebetween so that stable motor characteristics can be obtained.

In order to achieve the above object, according to a first aspect of the present invention, an electric rotary machine includes a stator which comprises: a plurality of salient poles each including a pole tooth; and a stator ring adapted to enclose the salient poles thereby forming a magnetic circuit, the stator ring having its inner surface formed flat at portions each to be jointed to an outer end face of the pole tooth thereby realizing surface-to-surface contact between the stator ring and the pole teeth.

According to a second aspect of the present invention, in the electric rotary machine of the first aspect, the stator ring is tubular with a polygonal cross-section.

According to a third aspect of the present invention, the electric rotary machine of the second aspect further comprises a pole tooth ring, which is adapted to enclose, position and fixedly hold the above salient poles, is disposed inside the stator ring, and which is tubular with a polygonal cross-section.

According to a fourth aspect of the present invention, in the electric rotary machine of the second or third aspect, the cross-section is dodecagonal.

According to a fifth aspect of the present invention, in the electric rotary machine of the second aspect, the stator ring is formed such that both ends of a flat steel plate are joined to each other at one of the portions formed flat.

According to a sixth aspect of the present invention, in the electric rotary machine of the third aspect, at least one air gap is provided between the pole tooth ring and the stator ring.

According to a seventh aspect of the present invention, in the electric rotary machine of the third aspect, the stator ring and the pole tooth ring are joined to each other such that one end of a flat steel plate for the stator ring is joined to the other end of a flat steel plate for the pole tooth ring and the other end of the flat steel plate for the stator ring is joined to one end of the flat steel plate for the pole tooth ring, whereby the stator ring and the pole tooth ring are both formed into a tubular configuration and at the same time are joined to each other.

According to the present invention, a magnetically well-balanced contact is realized between the stator ring and the salient poles, thereby forming a stable magnetic circuit, which results in suppressing the vibration of a motor in rotation. Also, the stator ring and the pole tooth ring can be assembled with reduced difficulty, which results in easily rendering the magnetic connection stable and in reducing the manufacturing time.

BRIEF DESCRIPTION OF THE DRAWINGS

The above and further features of the present invention will be apparent with reference to the following description and drawings, wherein:

FIGS. 5A and 5B in combination constitute an exploded perspective view of a salient pole (a coil omitted) shown in FIGS. 3 and 4, wherein FIG. 5A shows a bobbin and FIG. 3B shows a pole tooth portion;

FIGS. 7A to 7C in combination constitute an exploded perspective view of an armature according to the present invention, wherein FIG. 7A shows a salient pole assembly which is constituted such that six salient poles each extending radially are arranged circumferentially at an equiangular position of 60 degrees with their respective bobbin flanges in contact with one another, FIG. 7B shows a pole tooth ring, and FIG. 7C shows a stator ring;

DETAILED DESCRIPTION OF THE PREFERRED EMBODIMENTS

Preferred embodiments of the present invention will be described hereinafter with reference to the accompanying drawings. In the drawings, components that are the same as or equivalent to those in the conventional embodiment shown in FIGS. 1 and 2 are denoted by the same reference numbers, and detailed descriptions thereof are omitted.

Figure 3:
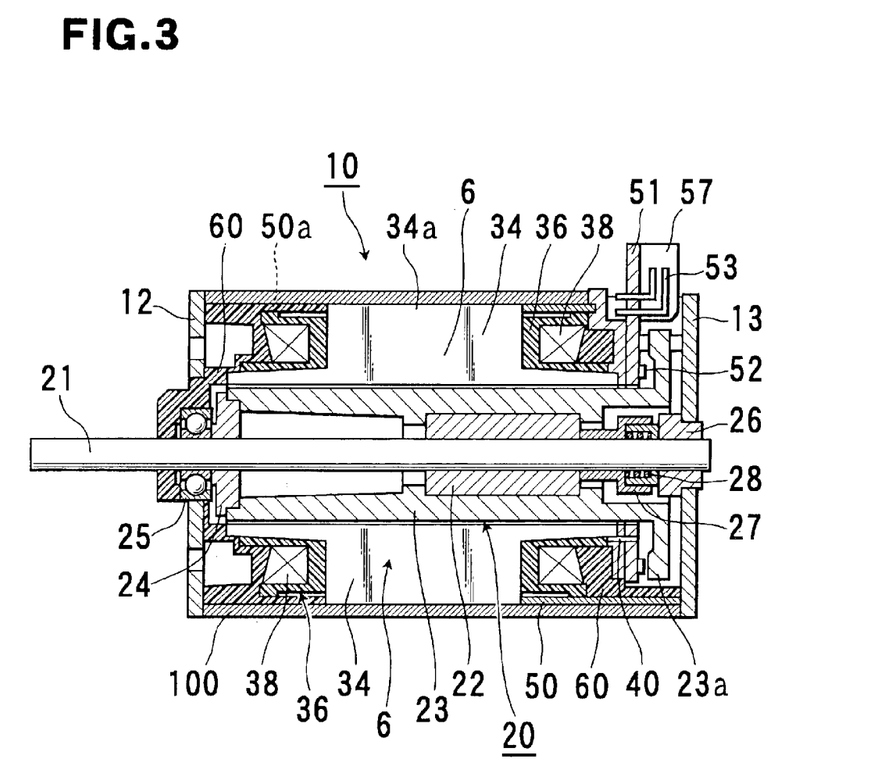
FIG. 3 is a sectional view taken along the axial direction, showing a first embodiment of an electric rotary machine according to the present invention.
Figure 4:
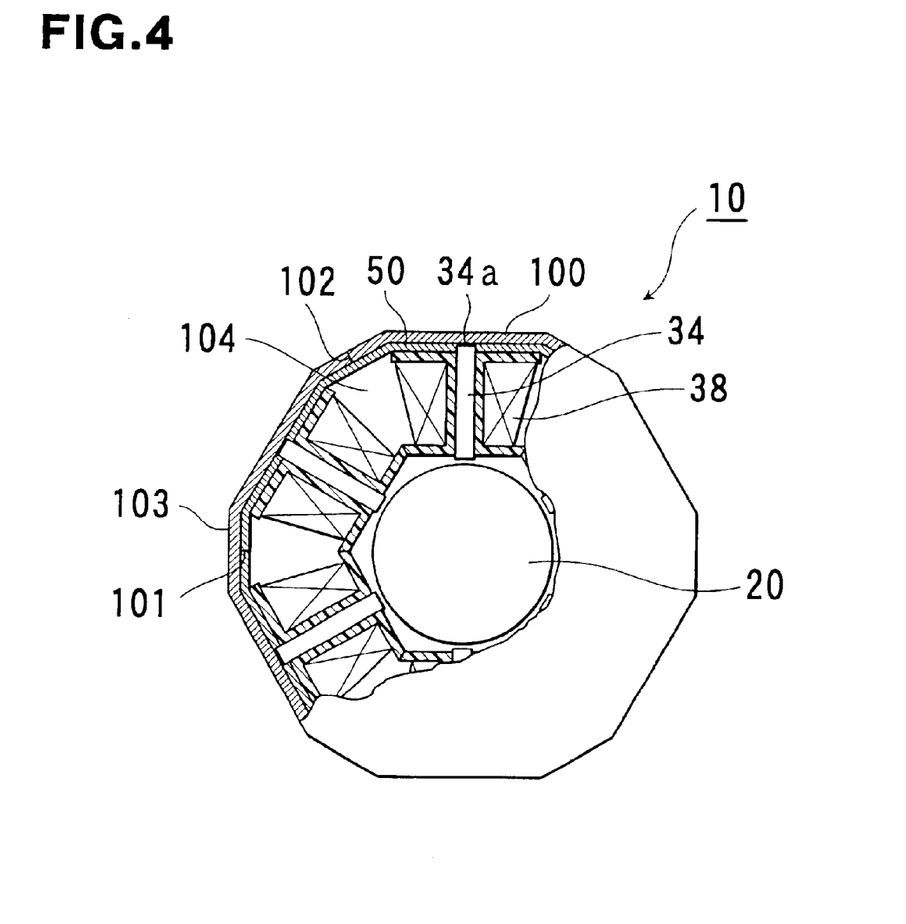
FIG. 4 is a partially sectional view seen in the axial direction, showing the electric rotary machine shown in FIG. 3.

Referring to FIGS. 3 and 4, illustrated are: salient poles 6, an armature assembly 10, flanges 12 and 13, a rotor assembly 20, a shaft 21, a sleeve 22, a rotor field magnet 23, a rotor position detecting magnet section 23a, a spacer 24, a ball bearing 25, a sleeve bearing 26, a pre-load holder 27, a pre-load spring 28, pole teeth 34, front end surfaces 34a, bobbins 36, magnet wires 38, terminal pins 40, a pole tooth ring 50, slits in pole tooth ring 50a, a printed circuit board 51, a hole sensor 52, connector terminals 53, a connector 57, resin 60, a stator ring 100, a joint 101 of the pole tooth ring 50, a joint 102 of the stator ring 100, flat portions 103, and resin spaces 104.

In this embodiment, the electric rotary machine is a three-phase inner rotor type brushless DC motor with six salient poles and eight rotor magnetic poles. The embodiment here refers to a so-called integrally resin-molded armature assembly manufactured such that resin is filled in the armature assembly except a portion where a rotor field magnet is received. The brushless DC motor is essentially composed of the armature assembly 10, the flanges 12 and 13 provided at both axial ends of the armature assembly 10, and the rotor assembly 20 provided rotatably in the armature assembly 10.

The armature assembly 10 has the stator ring 100 disposed around the outer periphery thereof. The pole tooth ring 50 is fitted tightly inside the stator ring 100. Within the pole tooth ring 50, six salient poles 6 extending radially are arrayed circumferentially at an equiangular position of 60 degrees.

In a preferred embodiment of the present invention, the stator ring 100 and the pole tooth ring 50 are each formed into a tube dodecagonal in section as shown in FIG. 4. Due to an advantageous shape of such a polygon, an inner surface of the stator ring 100 which is joined to the front end surface 34a of the pole tooth 34 can be made flat. Therefore, the front end surface 34a of the pole tooth 34 can make a surface-to-surface contact with the inner surface of the stator ring 100 thus achieving a magnetically well-balanced contact between the salient poles and the stator ring, which suppresses the vibration of the electric rotary machine while rotating.

Furthermore, since the pole tooth ring 50 takes the same configuration as the stator ring 100 with a slight reduction in dimension, the pole tooth ring 50 can be firmly fixed without any air gap inside the stator ring 100, which can keep a more stable magnetic balance.

In addition, the flat plate pieces to be formed into decagonal tubes for the pole tooth ring 50 and for the stator ring 100 are each preferably configured such that both ends thereof are joined with each other at one flat surface of the decagonal tube rather than at one corner as shown in FIG. 4.

With such a configuration, the both ends of the flat plates for the two rings can be joined to each other on a flat working table, which makes the joining operation easier, compared with the conventional operation in which the flat plates are worked on a table with cylindrical surface so as to be formed into a circular cylindrical ring.

Figure 5A:
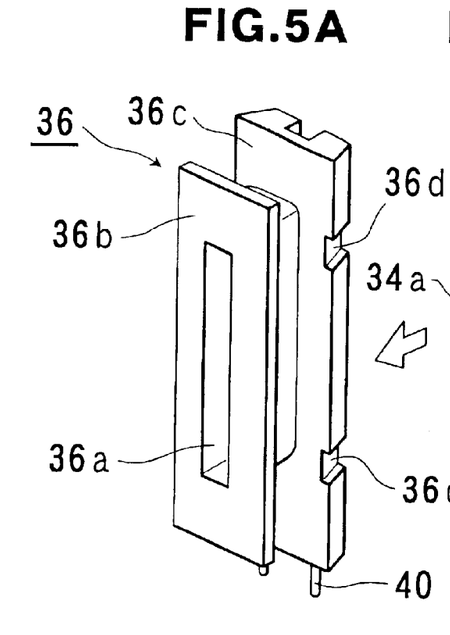
Figure 5B:
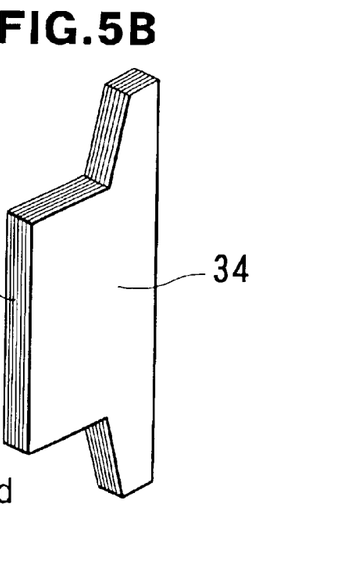
Figure 6:
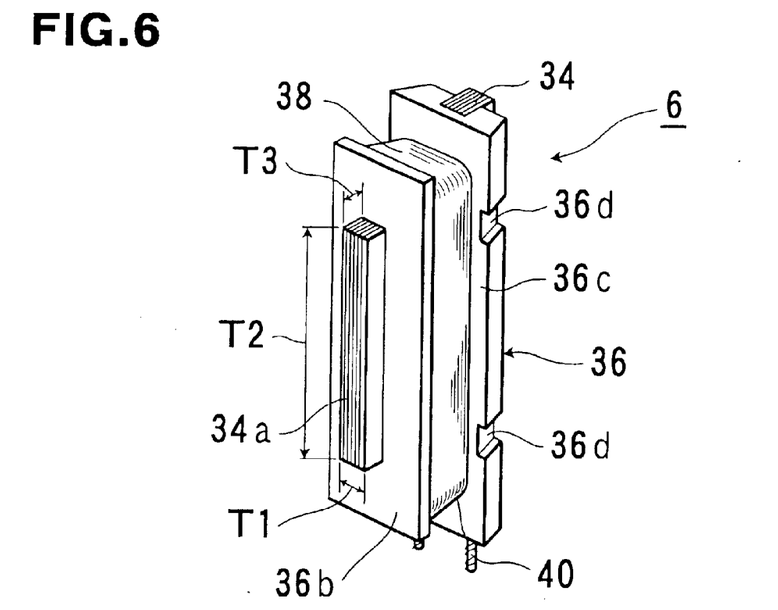
FIG. 6 is a perspective view of the salient pole (the coil included) shown in FIGS. 3 and 4.

Next, the salient pole 6 will be explained with reference to FIGS. 5A, 5B, and 6. In FIGS. 5A, 5B and 6, components that are the same as or equivalent to those shown in FIGS. 3 and 4 are denoted by the same reference numbers.

Referring to FIGS. 5A and 5B, the salient pole 6 is structured such that electromagnetic steel sheets, each of which has its surface insulated, has a thickness of 0.5 mm, and is punched out approximately in T-shape, are stacked as shown in FIG. 5B to form the pole tooth 34, the vertical bar (horizontal in the figure) of the T-shaped pole tooth 34 is inserted into a rectangular hole 36a having a width of T1 (see FIG. 6) of the bobbin 36 as shown in FIGS. 5A and 5B, and that the magnet wire 38 is wound on the bobbin 36 between bobbin flanges 36b and 36c as shown in FIG. 6.

Referring to FIG. 6, the pole tooth 34 is dimensioned such that the vertical bar (horizontal in the figure) of the T-shape protrudes by predetermined length of T3 overall from the surface of the bobbin flange 36b. The magnet wire 38 has its both terminations bound around respective terminal pins 40 inserted in the lower end of the bobbin flanges 36c.

Furthermore, recesses 36d and 36d to respectively form resin injection holes (to be described later) for pouring molding resin are provided apart from each other on each of the sides (only one side is shown in the figure) of the bobbin flanges 36c.

Figure 7A:
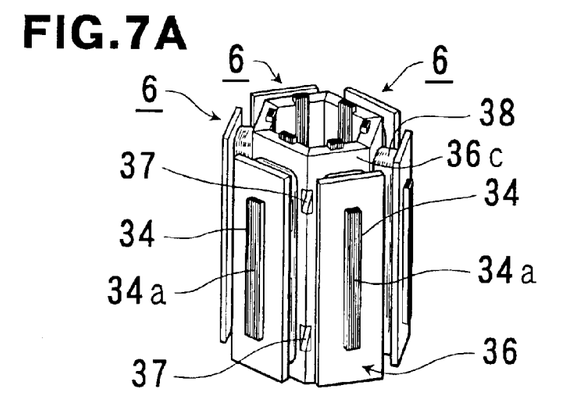
Figure 7B:
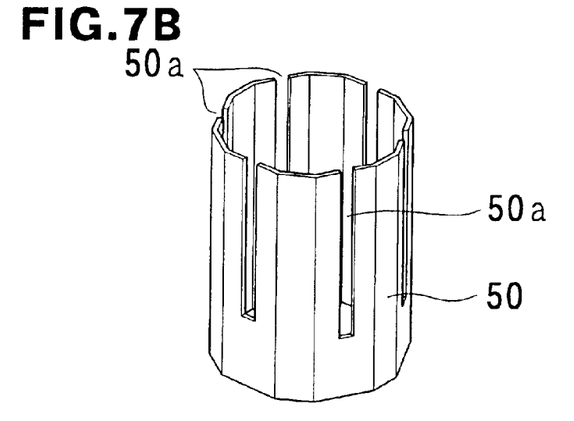
Figure 7C:
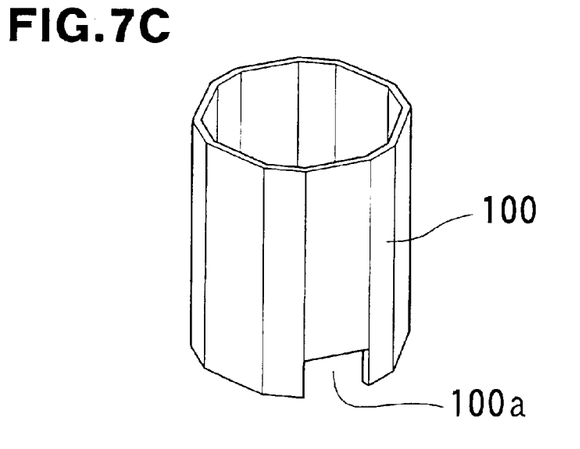

The armature assembly 10 will be described with reference to FIGS. 7A to 7C. In FIGS. 7A–7C, components that are the same as or equivalent to those shown in FIGS. 3 to 6 are denoted by the same reference numbers, and detailed descriptions thereof are omitted.

As shown in FIG. 7A, two recesses 36d and 36d provided on one side of the bobbin flange 36c of the bobbin 36 of one salient pole 6 oppose two recesses 36d and 36d provided on one side of the bobbin flange 36c of the bobbin 36 of another salient pole 6 adjacent to the one salient pole 6, thus forming respective resin injection holes 37.

The pole tooth ring 50 shown in FIG. 7B encloses the salient pole assembly shown in FIG. 7A. The pole tooth ring 50 is made of steel and may be formed into a cylinder by drawing process, or into a polygonal (dodecagonal in the figure) tube by bending a flat plate.

As shown in FIG. 7B, the pole tooth ring 50 has six slits 50a extending in the direction of length parallel to the rotation axis of the rotor field magnet 23 and arranged at an equidistant interval in the circumferential direction. The slits 50a do not always have to be set to be equidistant from one another and may alternatively be arrayed at irregular intervals for the purpose of controlling the cogging torque. The slits 50a not only guide and duly position respective salient poles 6 but also fix the respective salient poles 6 in place on the pole tooth ring 50.

The stator ring 100 shown in FIG. 7C encloses the salient pole assembly fixedly enclosed in the pole tooth ring 50, and, unlike the pole tooth ring 50, do not have a positioning mechanism or a fixing mechanism anywhere on its surface. A cutaway 100a is provided at the lower end of the stator ring 100 for passing the connector 57 (see FIG. 3).

In this embodiment, the stator ring 100 is formed into a dodecagonal tube, but the present invention is not limited to the above configuration, and any polygonal tube may be adopted so long as the inner surface of the stator ring 100 makes surface-to-surface contact with the front end surface 34a of the pole tooth 34.

Figure 8:
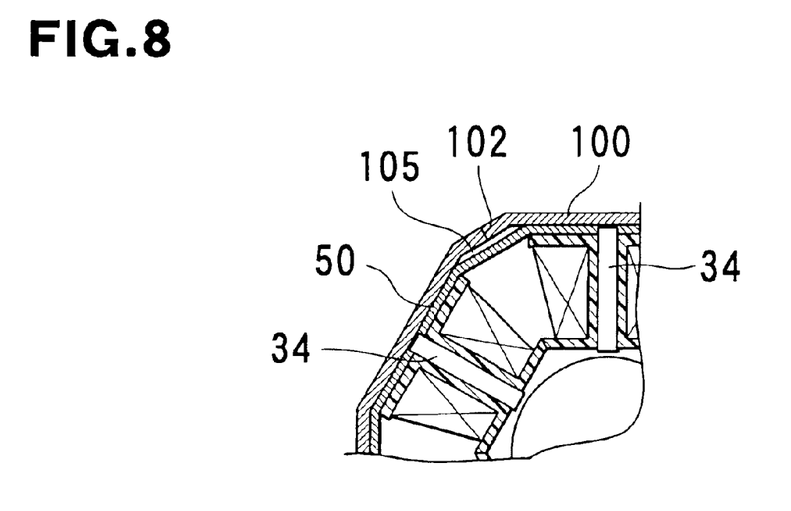
FIG. 8 is a partially sectional view showing a second embodiment according to the present invention.
Figure 9:
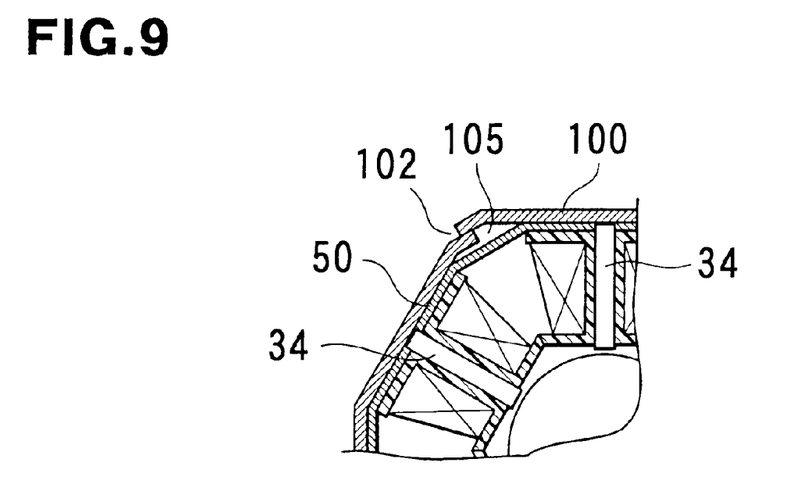
FIG. 9 is a partially sectional view showing another configuration of the second embodiment according to the present invention.

Next, a second embodiment according to the present invention will be explained. Referring to FIG. 8, there is provided a small air gap 105 between the outer surface of the pole tooth ring 50 and the inner surface of the stator ring 100, specifically at a portion between two adjacent salient poles 6 where the pole tooth 34 is not present. With such a configuration, the outer surface of the pole tooth ring 50 does not have to be in touch with the inner surface of the stator ring 100 all the way along their peripheries, which can make it easy to make a secure contact between the pole tooth ring 50 and the stator ring 100 thereby ensuring a stable magnetic connection. This embodiment may be modified as shown in FIG. 9, where both ends of the flat plate for the stator ring 100 are joined to each other via an overlapping portion 102. The modified embodiment provides the same effect as above described, and also relaxes the dimensional precision required for the stator ring 100. With the modified configuration of this embodiment, the stator ring 100 can be easily fabricated with reduced precision as well as a stable magnetic connection can be easily ensured.

Next, one example of joining the pole tooth ring 50 and the stator ring 100 will be described with reference to FIG. 10.

Figure 10:
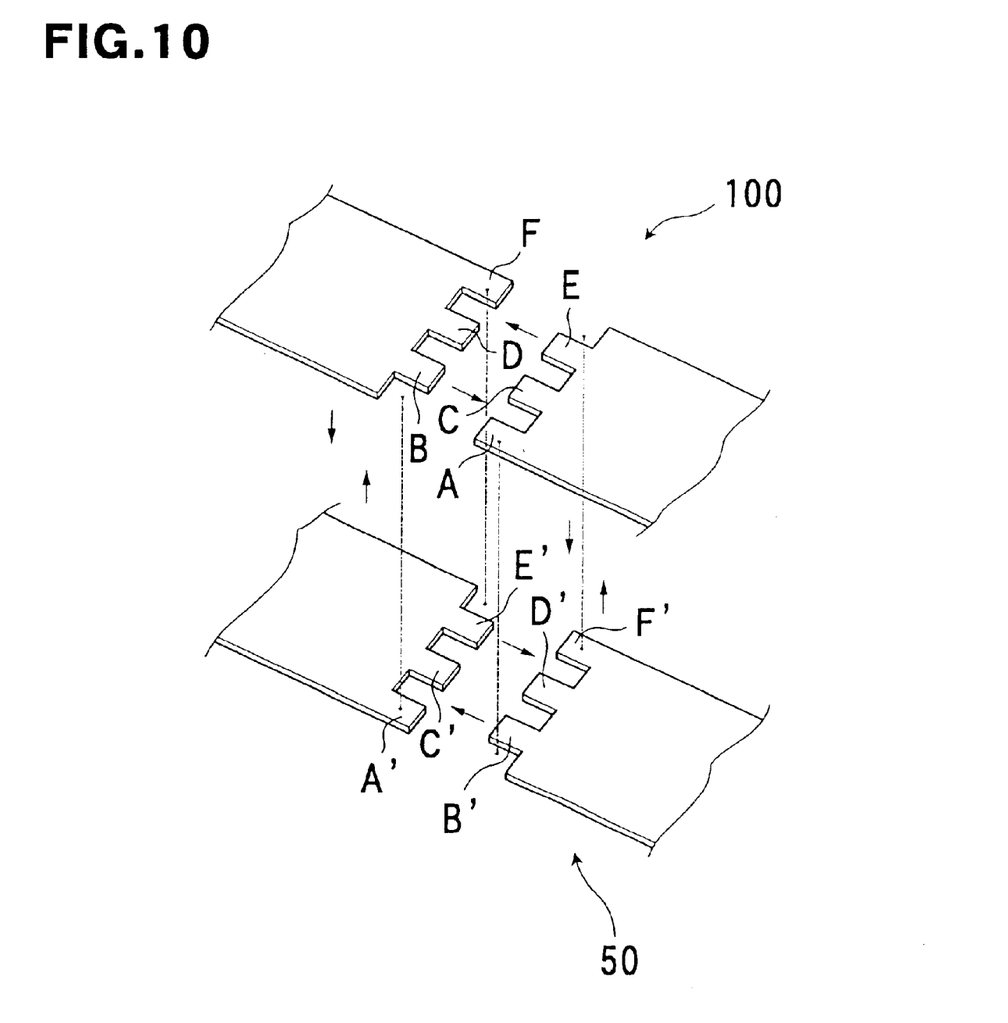
FIG. 10 is a view showing an example of a method for joining both ends of respective flat plates polygonally rolled into the pole tooth ring and the stator ring.

First, the both ends of the pole tooth ring 50 and of the stator ring 100 are toothed as shown in FIG. 10. In this processing, it is desirable that teeth formed on one end of the pole tooth ring 50 have a depth identical with the depth of teeth formed on the other end thereof, and the same processing is desirable for the stator ring 100. Then, a portion A' of the pole tooth ring 50 is welded to a portion A of the stator ring 100, a portion B' of the pole tooth ring 50 to a portion B of the stator ring 100, a portion C' of the pole tooth ring 50 to a portion C of the stator ring 100, a portion D' of the pole tooth ring 50 to a portion D of the stator ring 100, a portion E' of the pole tooth ring 50 to a portion E of the stator ring 100, and finally a portion F' of the pole tooth ring 50 to a portion F of the stator ring 100.

The above method makes it possible to form respective flat plate pieces for the pole tooth ring 50 and for the stator ring 100 into a tubular shape, and at the same time to join the pole tooth ring 50 to the stator ring 100.

What is claimed is:

1. In an electric rotary machine, a stator comprising:

a plurality of salient poles each including a pole tooth;

a stator ring enclosing the salient poles thereby forming a magnetic circuit, said stator ring having an inner surface formed flat at portions, each to be jointed to an outer end face of said pole tooth, wherein said stator ring makes surface-to-surface contact with each pole tooth, and wherein said stator ring is tubular with a polygonal cross-section; and a tubular pole tooth ring with a polygonal cross-section, enclosing, positioning and fixedly holding said salient poles, said pole tooth ring being disposed inside said stator ring, wherein at least one air gap is provided between said pole tooth ring and said stator ring.

2. An electric rotary machine as set forth in claim 1, wherein said cross-section is dodecagonal.

3. An electric rotary machine as set forth in claim 1, wherein said stator ring is formed such that both ends of a flat steel plate are joined to each other at one of said portions formed flat.

4. In an electric rotary machine, a stator comprising:

a plurality of salient poles each including a pole tooth;

a stator ring enclosing the salient poles thereby forming a magnetic circuit, said stator ring having an inner surface formed flat at portions, each to be jointed to an outer end face of said pole tooth, wherein said stator ring makes surface-to-surface contact with each pole tooth, and wherein said stator ring is tubular with a polygonal cross-section; and a tubular pole tooth ring with a polygonal cross-section, enclosing, positioning and fixedly holding said salient poles, said pole tooth ring being disposed inside said stator ring, wherein said stator ring and said pole tooth ring are joined to each other such that one end of a flat steel plate for said stator ring is joined to the other end of a flat steel plate for said pole tooth ring and the other end of said flat steel plate for said stator ring is joined to one end of said flat steel plate for said pole tooth ring, wherein said stator ring and said pole tooth ring are both formed in the shape of a tubular configuration and are both joined to each other.

5. An electric rotary machine as set forth in claim 4, wherein said cross-section is dodecagonal.

6. An electric rotary machine as set forth in claim 4, wherein said stator ring is formed such that both ends of a flat steel plate are joined to each other at one of said portions formed flat.

* * * * *